United States Patent [19]

Ries et al.

[11] Patent Number: 5,125,753
[45] Date of Patent: Jun. 30, 1992

[54] DEVICE TO MEASURE FLOW-THROUGH AND/OR QUANTITY OF HEAT

[75] Inventors: Peter Ries, Reinach; Paul Nauer, Steinhausen; Wolfgang Huber, Cham, all of Switzerland

[73] Assignee: Landis & Gyr Betriebs AG, Zug, Switzerland

[21] Appl. No.: 774,722

[22] Filed: Oct. 7, 1991

Related U.S. Application Data

[63] Continuation of Ser. No. 496,802, Mar. 21, 1990, abandoned.

[30] Foreign Application Priority Data

Apr. 3, 1989 [CH] Switzerland .................. 1214/89
Mar. 8, 1990 [CH] Switzerland ................... 744/90

[51] Int. Cl.$^5$ ............... G01K 17/10; G01K 17/16; G01F 1/22; G01F 1/34
[52] U.S. Cl. ................................ 374/41; 374/40; 73/861.53; 73/861.62; 364/510; 364/556
[58] Field of Search ............. 374/40, 41; 73/861.61, 73/861.62, 861.53, 861.58; 364/510, 556

[56] References Cited

U.S. PATENT DOCUMENTS

| | | | |
|---|---|---|---|
| 1,813,100 | 7/1931 | Swindle | 73/861.62 |
| 2,816,441 | 12/1957 | Ezekiel | 73/861.58 |
| 2,858,700 | 11/1958 | Rose | 73/861.53 |
| 2,944,420 | 7/1960 | Streeter | 73/861.55 |
| 3,037,384 | 6/1962 | Good | 73/861.62 |
| 3,079,796 | 3/1963 | Freudenthal et al. | 73/861.62 |
| 3,906,792 | 9/1975 | Miller | 73/861.53 |
| 3,971,252 | 7/1976 | Onoda | 374/41 |
| 4,006,634 | 2/1977 | Billette et al. | 73/861.53 |
| 4,254,664 | 3/1981 | Graham | 73/861.58 |
| 4,375,169 | 3/1983 | Torresin | 73/861.53 |
| 4,750,464 | 6/1988 | Staerzl | 73/861.02 |
| 4,773,023 | 9/1988 | Giardina | 374/41 |
| 4,881,185 | 11/1989 | Murakami et al. | 374/40 |
| 4,918,994 | 4/1990 | Kramer | 73/861.53 |
| 4,938,077 | 7/1990 | Robinet | 73/861.62 |

FOREIGN PATENT DOCUMENTS

| | | | |
|---|---|---|---|
| 0219489 | 10/1986 | European Pat. Off. | |
| 0309643 | 5/1988 | European Pat. Off. | |
| 0341786 | 10/1921 | Fed. Rep. of Germany | 73/861.53 |
| 839870 | 5/1952 | Fed. Rep. of Germany | |
| 1473411 | 11/1963 | Fed. Rep. of Germany | |
| 3444752 | 6/1975 | Fed. Rep. of Germany | 73/861.53 |
| 2736825 | 2/1979 | Fed. Rep. of Germany | 374/40 |
| 2830729 | 1/1980 | Fed. Rep. of Germany | 374/40 |
| 3210901 | 9/1983 | Fed. Rep. of Germany | |
| 3244468 | 6/1984 | Fed. Rep. of Germany | |
| 3700898 | 7/1988 | Fed. Rep. of Germany | |
| 0349723 | 6/1937 | Italy | 73/861.53 |
| 0047783 | 4/1977 | Japan | 374/41 |
| 8101492 | 10/1982 | Netherlands | 374/41 |
| 8600247 | 1/1986 | Netherlands | |
| 0445878 | 3/1968 | Switzerland | 73/861.61 |
| 0915544 | 2/1983 | U.S.S.R. | 374/41 |
| 1490989 | 11/1977 | United Kingdom | 73/861.58 |
| 2026704 | 2/1980 | United Kingdom | 73/861.53 |
| 2042733 | 9/1980 | United Kingdom | 374/41 |

OTHER PUBLICATIONS

"Sliding Valve with Segmented Orifice operates Efficiently Over Full Range of Flow," Eng. Mat. & Design, vol. 19, No. 12, p. 241 (Dec. 1975).
Vergleich von . . . ein Forschungsproject, Fernwarme Int'l—FWI, Jg. 17 (1988) pp. 23–25.

Primary Examiner—Allan N. Shoap
Assistant Examiner—Diego F. F. Gutierrez
Attorney, Agent, or Firm—Marmorek, Guttman & Rubenstein

[57] ABSTRACT

A heat circuit comprises an initial conduit containing a flow medium and a return conduit. A choke element located in a conduit such as the initial conduit of a heat circuit serves to control the flow of the flow medium. The choke element has several active positions in which openings having differently sized cross-sections are inserted into the path of flow. The choke element is moved by a drive so that a particular position of the choke is active. A differential pressure sensor measures the presure difference before and after the choke element. A computer resposive to the differential pressure sensor controls the drive so that a particular cross-section of the choke element takes effect and the flow of the medium is measured with sufficient precision over a wide measuring range. The inventive arrangement may also include a temperature sensor for measuring the temperature difference between the initial and return conduits. The computer which controls the choke drive may also be responsive to this temperature difference.

9 Claims, 3 Drawing Sheets

1

DEVICE TO MEASURE FLOW-THROUGH AND/OR QUANTITY OF HEAT

This is a continuation of application Ser. No. 07/496,802 filed Mar. 21, 1990, now abandoned.

FIELD OF THE INVENTION

The instant invention relates to a device to measure flow and/or quantity of heat.

BACKGROUND OF THE INVENTION

A device to measure flow and quantity of heat is known from DE-OS 32 44 668. To measure quantity of heat, the difference of initial and final temperature of a heat circuit, the flow cross-section in form of the valve stroke as well as the pressure difference produced at the shut-off device are ascertained, are transmitted to an electronic logic unit, are combined, displayed, summed, and again displayed.

DE-OS 32 10 901 discloses a device to ascertain the quantity of hot water and the heat consumption whereby the valve opening width is measured and the hot water quantity is derived therefrom. The effective differential pressure is not measured, so that relatively great measurement errors necessarily occur when the differential pressure varies.

DE-OS 37 00 898 discloses a quantity regulating valve in which the pressure and the temperature before and after the valve as well as the opening cross-section of the valve are measured and are processed by a computer.

EP-OS 0 309 643 furthermore discloses a quantity regulating valve in which the means for the measuring of the differential pressure are located above the valve, inside the enclosing body.

Even when the actual pressure difference is measured, the problem remains that measuring errors which cannot be tolerated occur with very low flows. In the DE-Z "Fernwärme international" 17(1988), volume 1, pages 23-35 the occurring problems are pointed out. In flow measuring and control systems based on the principle of effective pressure measurement, the problem basically remains that the measured pressure difference represents a square function of the flow speed. If the measure of the differential pressure is sufficiently precise in a range from 10 to 100% of the nominal flow of the measuring device, i.e. with a ratio 1:10, the corresponding flow-through speeds are at a ratio of $1:\sqrt{10}$. It follows from this that ordinary measuring devices for flow speeds have only a small measuring range of sufficient measuring precision. Therefore the measuring range is also correspondingly small in heat measurements.

It is known that especially in transition periods, extremely low flows often occur, which are beyond the measuring range of the measuring means.

The instant invention has therefore as its object to create a device to measure flow and heat quantities at low manufacturing cost, having a measuring range of sufficient precision that is distinctly greater than that of known devices.

SUMMARY OF THE INVENTION

The present invention relates to an arrangement for measuring flow and heat related quantities with precision over a wide measuring range.

In an illustrative embodiment of the invention, a heat circuit comprises an initial conduit containing a flow medium and a return conduit. A choke element located in a conduit such as the initial conduit of a heat circuit serves to control the flow of the flow medium. The choke element has several active positions in which openings of differently sized cross-sections are inserted into the path of flow. The choke element is moved by a drive so that a particular position of the choke is active. A differential pressure sensor measures the pressure difference before and after the choke element. A computer responsive to the differential pressure sensor controls the drive so that a particular cross-section of the choke element takes effect and the flow of the medium is measured with sufficient precision over a wide measuring range. The inventive arrangement may also include a temperature sensor for measuring the temperature difference between the initial and return conduits. The computer which controls the choke drive may also be responsive to this temperature difference.

DETAILED DESCRIPTION OF THE INVENTION

Figure 1:
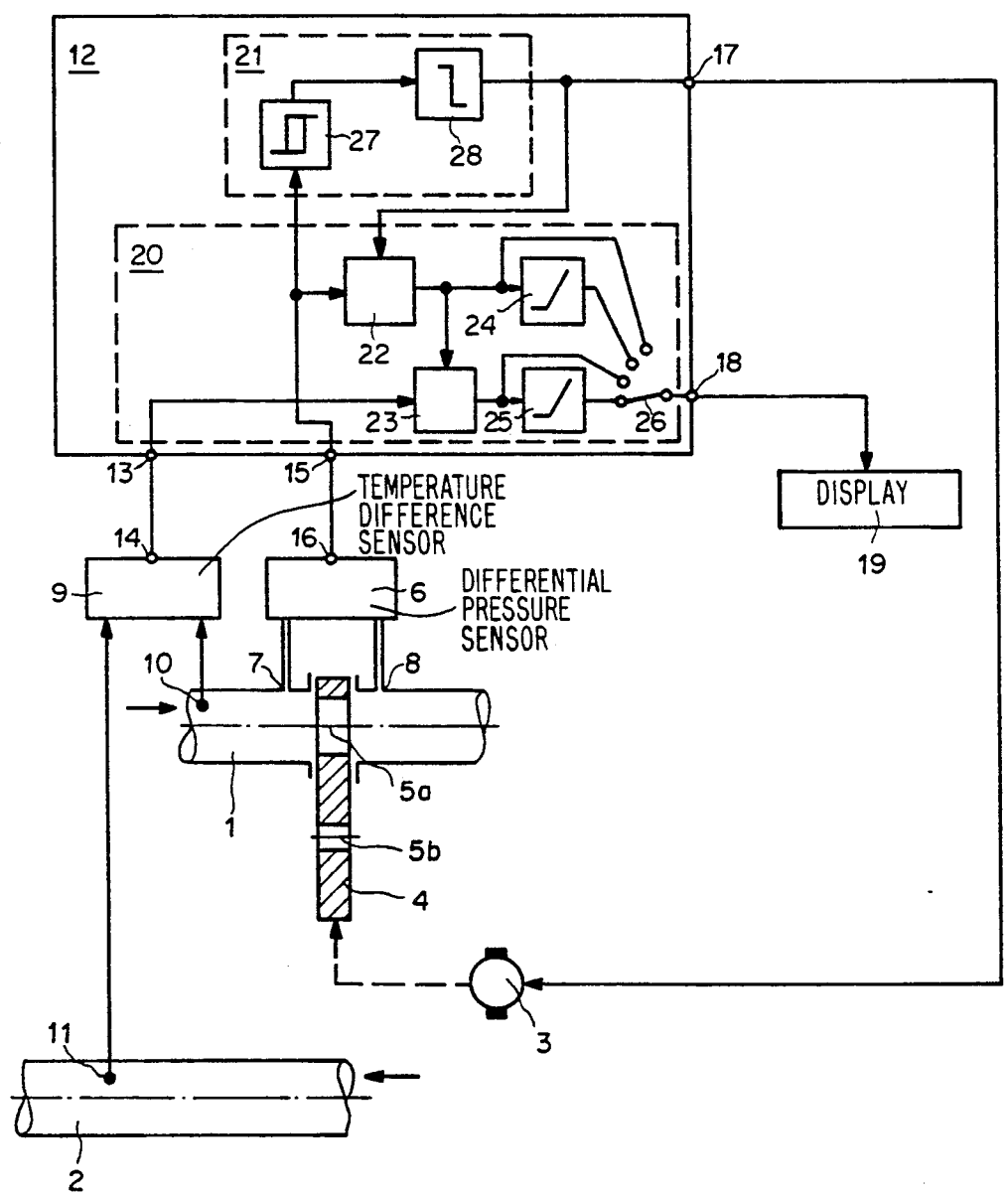
FIG. 1 shows a block diagram of a device with a two-phase choke element, in accordance with the present invention.

In FIG. 1, the reference numeral 1 designates an initial conduit for a flow medium of a heat circuit and reference numeral 2 designates a return conduit of a heat circuit. A choke element 4 actuated by a drive 3 is built into the conduit 1. This choke element 4 is provided with a first opening 5a which takes effect in the drawn position and thus represents the effective cross-section of the choke element, and with a second opening 5b. The choke element 4 has two positions, with one of the openings 5a, 5b taking effect in each of the two positions. The position in which the opening 5a is effective shall be designated hereinafter as position II, while the position in which the opening 5b is effective is designated as position I.

Reference 6 designates a differential pressure sensor which is connected via a first opening 7 to the space before the choke element 4 and via a second opening 8 to the space behind the choke element 4.

Reference 9 designates a temperature difference measuring element which measures the temperature of the flow medium in the conduit 1 by means of a first measuring point 10 and in the return conduit 2 by means of a second measuring point 11 and calculates from this the temperature difference between the initial conduit 1 and the return conduit 2.

Reference 12 designates a computer. It is provided with a first input 13 which is connected to an output 14 of the temperature difference measuring element 9 and with a second input 15 which is connected to an output 16 of the differential pressure sensor 6. The computer 12 is provided with a first output 17 which is connected to the drive 3, and with a second output 18 to which a display 19 is connected.

The internal layout of the computer 12 shall be described below. This description is based on an analog computer. The computer 12 can however also be a digital computer. Its functions can be derived without difficulty from the description of the analog computer. A digital computer is of course equipped with analog-digital converters or digital-analog converters at its inputs and outputs.

The computer 12 comprises a functional block 20 serving essentially to calculate basic flow and quantity of heat values and of a control block 21 serving mainly to control the choke element 4. The functional block 20 comprises a first multiplier 22, a second multiplier 23, a first integrator 24, a second integrator 25 and a switch 26. The control block 21 comprises a threshold switch 27 and a time-delay device 28 which causes a fall-delay time and thus prolongs a HIGH signal.

The threshold switch 27 switches as follows: Below a differential pressure $p_{off}$ its output has a LOW signal. With increasing value of the differential pressure its output signal changes from LOW to HIGH as soon as the differential pressure rises above the upper threshold $p_{on}$, and as the value of the differential pressure then drops, its output signal changes from HIGH to LOW as soon as the differential pressure drops again below the lower threshold $p_{off}$. Thus a hysteresis of the magnitude $p_{on} - p_{off}$ exists.

The input 13 of the computer 12 is connected to the input of the multiplier 23. The input 15 is connected to a first input of the multiplier 22 as well as to the input of the threshold switch 27. The output of the threshold switch 27 is connected to the input of the time-delay device 28, the output of which in turn is connected to the output 17 of the computer 12 as well as to a second input of the multiplier 22. The output of the multiplier 22 is connected to a second input of the multiplier 23 as well as to the input of the integrator 24 and directly to a first contact of a switch 26. The output of the integrator 24 is connected to a second contact of the switch 26. In identical manner, the output of the multiplier 23 is connected to a third contact of the switch 26 and to the input of the integrator 25. The output of the integrator 25 is connected to a fourth contact of the switch 26. The central contact of the switch 26 is connected to the output 18.

The functioning of this device is described below. Let it be assumed that the choke element 4 is in the position shown in FIG. 1, in which the larger opening 5a takes effect. This position is designated as position II. The output signal of the differential pressure sensor 6 reaches the first input of the multiplier 22 at the second input of which a signal occurs which indicates whether the choke element 4 is in position I or in position II. This signal is in position II HIGH. Further below it shall be explained how the signal and its change are brought about. In the multiplier 22 a factor characterizing the flow in the applicable position of the choke element is stored in the multiplier 22 for either of these positions, and thereby for the signals HIGH and LOW. The multiplier 22 now multiplies this factor with the signal of the differential pressure sensor 6 and thus finds a characteristic flow rate magnitude. This flow rate magnitude appears at the output of the multiplier 22 and is then displayed by the display 19 when the switch 26 is in the corresponding position. The characteristic flow rate magnitude is furthermore fed to the integrator 24. At the output of the integrator 24 appears a signal corresponding to the cumulative flow-through. This value can also be displayed when the switch 26 is in the corresponding position.

The output signal of the temperature difference measuring element 9 reaches the first input of the multiplier 23 at the second input of which the characteristic flow rate magnitude appears. These two magnitudes are multiplied by the multiplier 23, resulting in the heat flow which occurs at the output of the multiplier 23 and can be displayed when the switch 26 is in the corresponding position. The output signal of the multiplier 23 is furthermore transmitted to the integrator 25 in which the heat flow is cumulated into the quantity of heat. This quantity of heat can also be displayed when the switch 26 is in the corresponding position. This position is shown in FIG. 1.

Let it now be assumed that the flow going through the choke element 4 drops. With it the differential pressure which is measured by the differential pressure sensor 6 and is transmitted to the threshold switch 27 also drops. The threshold switch 27 evaluates this signal. If the signal falls below the lower threshold $p_{off}$ which characterizes the switching of the threshold switch 27, the signal at the output of the threshold switch 27 changes from HIGH to LOW. This signal change appears with a slight delay also at the output of the time-delay device 28. Through this signal change, the drive 3 is triggered so that it moves the choke element 4 and in such manner that the first opening 5a is moved out of the cross-section of the conduit 1 and the second opening 5b is moved into the cross-section of the conduit 1, so that now the smaller opening 5b represents the effective cross-section of the choke element 4. This corresponds to position I.

Simultaneously with the adjstment of the choke element 4 the multiplier 22 also receives the information concerning the change of position. The LOW signal now appears at its second input. Consequently the factor for the flow-through corresponding to this LOW signal is activated in the multiplier 22 and is multiplied in the multiplier 22 with the signal of the differential pressure sensor 6. This signal is now greater because of the smaller effective cross-section of the choke element 4. Thus the flow rate occurring in position I is measured and is processed as indicated earlier.

If the flow-through increases again, the measured pressure difference also increases. If the pressure difference exceeds the upper threshold $p_{on}$ which characterizes the switching of the threshold switch 27, the signal at its output changes to HIGH. This signal change from LOW to HIGH in turn triggers the drive 3, so that the latter switches the choke 4 back to position II. At the same time the HIGH signal also occurs at the second input of the multiplier 22, so that now the flow factor corresponding to position II is taken into account in the multiplication.

The time delay of the signal change from HIGH to LOW caused by the time-delay device 28 prevents fluttering of the choke element 4. However the time may not be of any significant duration because the measuring precision of the device would be influenced unfavorably.

Automatic change-over of measuring range between two measuring ranges is achieved by means of the above-described device. Instead of two measuring ranges, it is also possible to provide for three or more if a corresponding number of additional positions of the choke element 4 and a greater number of threshold switches 27, each with different switching points, are provided.

Figure 2:
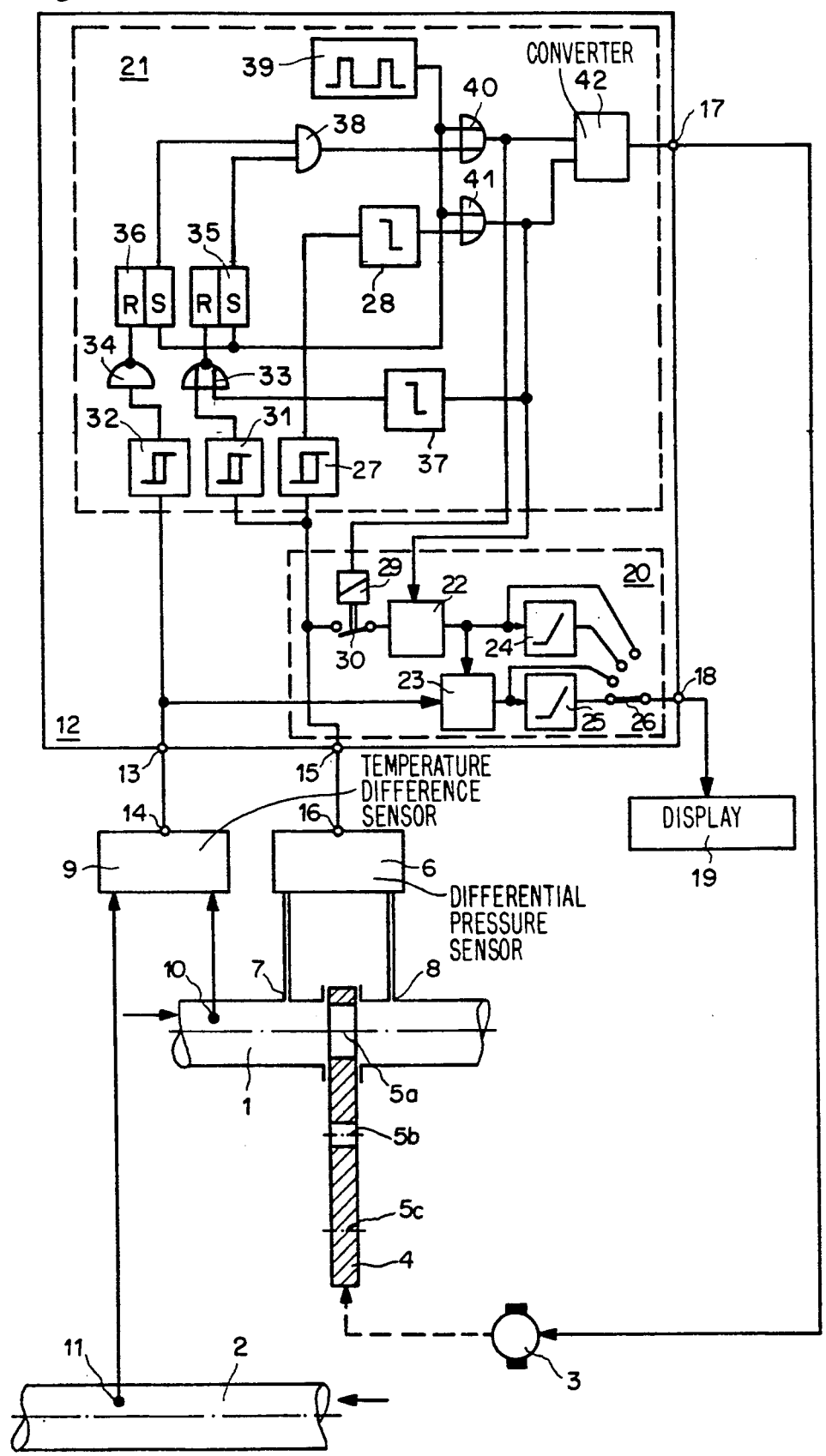
FIG. 2 shows a block diagram of a device with a three-phase choke element, in accordance with the present invention.

While the block display of FIG. 1 shows a two-phase choke element 4 which is capable of assuming a first position I and a second position II, FIG. 2 shows a three-phase choke element 4. It is advantageous for the choke element 4 to be able to assume a third position (position 0), in which the choke element 4 prevents the flow medium from going through. For this the choke element is provided with an area 5c which has no opening. The computer 12 has a slightly different layout in that case than for the two-phase choke element 4 because it must not only be able to control the drive 3 in positions I and II but in addition also in position 0.

FIG. 2 shows a block diagram with a three-phase choke element 4 and with the corresponding computer 12. The layout outside the computer 12 is different from FIG. 1 in only the single aspect that the choke element 4 has an area 5c which has no opening. If this area 5c is located within the initial conduit 1 the choke element 4 is closed. No flow of the flow medium is then possible.

Also according to FIG. 2 the computer 12 comprises the functional block 20 and the control block 21. The only difference between the functional block 20 of FIG. 2 and that of FIG. 1 is that a switching contact 30 actuated by a relay 29 is installed between the input 15 and the input of the multiplier 22.

There are greater differences in the control block 21: In addition to the threshold switch 27 a second threshold switch 31 and a third threshold switch 32, a NOR-gate 33, an invertor 34, a first flipflop 35 and a second flipflop 36 as well as an additional time-delay device 37 are provided. The time-delay device 37 causes a fall-delay time in the same manner as the time-delay device 28, so that a HIGH impulse is therefore prolonged.

The inputs of the threshold switches 27 and 31 are connected to the input 15 of the computer 12, the input of the threshold switch 32 is connected to the input 13 of the computer 12. The output of the threshold switch 31 is connected to an input of a NOR-gate 33 the output of which is connected to the reset input of the flipflop 35. The output of the threshold switch 32 is connected via an invertor 34 to the reset input of the flipflop 36.

The threshold switches 31 and 32 switch as follows: Below a differential pressure $p_{Uoff}$ the output of the threshold switch 31 has a LOW signal. With increasing value of the differential pressure its output signal changes from LOW to HIGH as soon as the differential pressure increases beyond the upper threshold value $p_{Uon}$ and as the value of the differential pressure then drops, its output signal changes from HIGH to LOW as soon as the differential pressure drops back to below the lower threshold value $p_{Uoff}$. Thus, a hysteresis of the magnitude $p_{Uon} - p_{Uoff}$ exists. The two threshold values $p_{Uon}$ and $p_{Uoff}$ are clearly below the threshold values $p_{on}$ and $p_{off}$ of the threshold switch 27. Below a temperature difference $T_{Uoff}$ the output of the threshold switch 32 has a LOW signal. As the value of the temperature difference increases, its output signal changes from LOW to HIGH as soon as the temperature difference increases beyond the upper threshold value $T_{Uon}$, and with the dropping value of the temperature difference, its output signal changes from HIGH to LOW as soon as the temperature difference drops again below the lower threshold value $T_{Uoff}$. Thus, there exists a hysteresis of the magnitude $T_{Uon} - T_{Uoff}$.

In addition, a clocking pulse generator 39 is provided, the output of which is connected to the input of a second OR-gate 40 and to that of a third OR-gate 41 as well as to the set inputs of the flipflops 35 and 36. The second input of the OR-gate 40 is connected to the output of the AND-gate 38, while the second input of the OR-gate 41 is connected to the output of the time-delay device 28. The outputs of the two OR-gates 40 and 41 lead to two inputs of a converter 42. The output of the converter 42 is connected to the output 17 of the computer 12 and controls the drive 3.

The output of the OR-gate 40 furthermore acts upon the relay 29. The output of the OR-gate 41 is in addition connected to the second input of the multiplier 22 as well as to the input of the time-delay device 37, the output of which is connected to the second input of the NOR-gate 33.

Operation is described below, insofar as it is different from that of the device according to FIG. 1. To begin with, the effect achieved by the clocking pulse generator 39 is not taken into consideration and it is assumed that is constantly emits a LOW signal.

Before discussing overall functions, the function of the converter 42 shall be first described. This converter 42 has two inputs at which either LOW or HIGH signal can appear, depending on the switched state of the upstream elements. This means that there are two two-value signals. These are now converted by the converter 42 into a three-value signal. If a LOW signal appears at the input connected to the OR-gate 40, the output of the converter 42 has also a LOW signal, whatever the state of the other input. If a HIGH signal appears at the input connected to the OR-gate 40 and a LOW signal appears at the input connected to the OR-gate 41, the output of the converter 42 has a signal ONE. If HIGH signals appear at both inputs of the converter 42, the output of the converter 42 has a signal TWO.

Thus the output of the converter 42 can assume three states: The signals LOW, ONE and TWO. The output of the converter 42 acts upon the drive 3 which can also assume three positions: Position 0 (closed), position I (smaller opening) and position II (larger opening). The effect is now that the converter 42 brings the drive 3 into position 0 when its output is LOW, that it brings it into position I when its output signal is ONE and that it brings it into position II when its output signal is TWO.

It shall now be assumed that the choke element 4 is in the position shown in FIG. 2, corresponding to the position II of the drive 3. This state exists when the output of the threshold switch 32 has the signal HIGH and when the output of the threshold switch 27 also has the signal HIGH. Because the pressure difference $p_{Uon}$ is thus necessarily exceeded also at the threshold switch 31, the outputs of the threshold switches 27, 31 and 32 all carry the HIGH signal. The reset inputs of the two flipflops 35 and 36 carry the LOW signal because of the inversion by the NOR-gate 33 or the invertor 34. The flipflops 35 and 36 are thus not reset and are consequently set by a preceding setting impulse coming from the clocking pulse generator 39. Correspondingly, the outputs of the two flipflops 35 and 36 also carry the HIGH signal. Since the HIGH signals also run through the two OR-gate 40 and 41, both inputs of the converter 42 carry the HIGH signal so that the signal TWO appears at the output of the converter 42 and so that the choke element 4 is consequently in the position as drawn.

As has already been described in the first embodiment, the multiplier 22 receives information that the position II applies. This is effected here through the connection of the output of the OR-gate 41 with the input of the multiplier 22, whereby the OR-gate 41 always carries the HIGH signal at its output when position II applies. Since the output signal of the OR-gate 40 is also HIGH, the relay 29 is in the excited position, so that the contact 30 is closed. If this contact 30 is closed the signal of the differential pressure sensor 6 goes to the input of the multiplier 22 and as a result the pressure difference is taken into account in calculating the flow and the quantity of heat as described earlier.

It is now assumed that the pressure difference measured by the differential pressure sensor 6 drops below the value $p_{off}$. In that case the output signal of the threshold switch 27 changes from HIGH to LOW. Delayed by the time-delay device 28, the signal change also reaches the OR-gate 41 and thus the input of the converter 42 which is connected with its output. Subsequently the converter 42 changes the state of its output from signal TWO to signal ONE, whereupon the drive 3 changes position, i.e. from position II into position I. Thus the opening 5b becomes the active cross-section of the choke element 4.

The signal change at the output of the OR-gate 41 also results in the signal to be changed to LOW at the input of the multiplier 22 which is connected to the output of the OR-gate 41. Consequently the multiplier 22 takes into account the factor belonging to Position I in calculating the flow rate.

If the differential pressure then continues to drop so that the value of $p_{Uoff}$ set on the threshold switch 31 is reached, the signal at the output of the threshold switch 31 changes from HIGH to LOW. The HIGH-LOW signal change is converted by the NOR-gate 33 into a LOW-HIGH signal change, because no clocking impulse of the clocking pulse generator 39 goes via the OR-gate 41 to the time-delay element 37 and is extended there. In this case, the flipflop 35 is reset and the LOW signal also appears at its output. Because both inputs of the AND-gate 38 now no longer show HIGH, the signal at the output of the AND-gate 38 changes to LOW. This signal also appears at the input of the converter 42 which is connected to the output of the OR-gate 40. Since both inputs of the converter 42 thus have the LOW signal, the LOW signal follows at the output of the converter 42, causing the drive 3 to move the choke element 4 in such manner that the zone 5c lies within the cross-section of the conduit 1. Thus position 0 is attained.

Because of the signal change from HIGH to LOW at the output of the OR-gate 40, the excitation of the relay 29 is also omitted so that the contact 30 opens. Thus the multiplier 22 does not receive any signal from the differential pressure sensor 6; the signal is zero. The subsequent multiplication with the factor in the multiplier 23 thus also gives the result zero. Consequently the values of the two integrators 24 and 25 also no longer increase. The flow rate and the heat flow thus become zero, the accumulated flow quantity and the heat quantity are not further increased. Thereby it is possible to ignore the data measured by the detection means, i.e. the differential pressure sensor 6 and the temperature difference measuring element 9.

The same effect is achieved if the value of the temperature difference drops below the limit value $T_{Uoff}$. In that case the AND element 38 is locked through the fact that a LOW signal appears at its input connected via invertor 34 and flipflop 36 to the output of the threshold switch 32. The 0 position is achieved also in this manner.

This means that the choke element always goes into its closed position (position 0) when the temperature difference between the initial conduit 1 and return conduit 2 of the heat circuit becomes very small or when the pressure difference becomes very small through the choke element. The closed position is brought about advantageously therefore when the temperature difference or the pressure difference becomes so small that it can no longer be measured with sufficient accuracy.

If the closed position (position 0) is attained the pressure difference immediately rises again and the output of the threshold switch 31 changes again to HIGH. However this signal change to HIGH does not take effect at the output of the flipflop 35. Consequently the choke element 4 remains at first in closed position (position 0). Similarly, an increase in temperature difference beyond the value $T_{Uon}$ would not cause the opening of the choke element 4. The clocking pulse generator 39 emits periodically, e.g. every 15 minutes, a HIGH signal of defined length while it emits a LOW signal at all other times. The rising edge of such a clocking impulse sets the two flipflops 35, 36. Only this setting of the flipflops 35, 36 makes it possible for their output signals to correspond to the output signals of the threshold switches 31 and 32. The choke element 4 is thus held in position 0 until the clocking impulse arrives from the clocking pulse generator 39.

A clocking impulse of the clocking pulse generator 39 furthermore makes it possible for the outputs of the two OR-gates 40 and 41 to change over to HIGH. Thereby both inputs of the converter 42 are HIGH so that the choke element 4 is subsequently controlled so as to necessarily be brought by drive 3 into position II. The choke element 4 is then brought into the correct position as described earlier in function of the applicable effective values for the pressure difference and the temperature difference.

Figure 3:
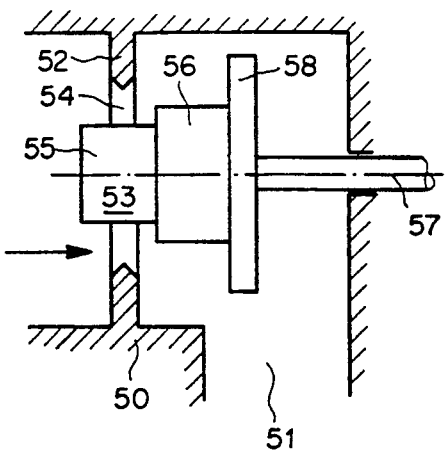
FIG. 3 shows a switchable choke element with three phases, in accordance with the present invention.

FIG. 3 shows an advantageous embodiment of a switchable choke element with three positions. A housing 50 encloses a flow channel 51 for the flow medium. Within the flow channel 51 a circular pin diaphragm 52 extends from housing 50 at a right angle to the direction of flow. A displacement body 53 penetrates into the opening of the circular pin diaphragm 52, causing an annular gap 54 to remain open which represents the effective cross-section of the choke element. The displacement body 53 comprises individual cylinders 55, 56 with discretely stepped outer diameters. The displacement body 53 is mounted by means of a shaft 57 in the housing 50 along its axis and in such manner as to be capable of displacement along its axis, it being possible to change the position of the displacement body 53 by means of the drive 3 (FIGS. 1 and 2). This displacement body 53 comprises also a plate 58 the outer diameter of which is greater than the opening of the circular pin diaphragm 52, so that the circular pin diaphragm 52 can be closed off by the plate 58. This position is position 0. If the cylinder 56 is within the circular pin diaphragm 52 and the plate 58 is not applied against the circular pin diaphragm 52, this corresponds to position I. If the cylinder 55 is within the circular pin diaphragm 52 as shown in FIG. 3, this corresponds to position II. There is an analogy to the openings 5a and 5b of different size of the first (FIG. 1) and that of the second (FIG. 2) embodiment, or to the position with the zone 5c without opening (FIG. 2).

It is possible to provide three or more cylinders of different sizes instead of the shown two cylinders 55, 56 of different sizes in order to achieve several annular gaps 54 of different sizes in that manner. The choke element can thus be set in several steps.

This embodiment has the advantage that it does not involve any particular sealing problems since only the shaft 57 is brought through the housing and must be sealed. Furthermore, the precision for positioning the displacement body 53 is not critical. Small differences in the position of the displacement body 53 have no bearing upon the size of the annular gap 54. The drive 3 can therefore also be advantageously simple in design. Furthermore stroke differences caused by heat do not affect the size of the annular gap 54.

It is advantageous to give the circular pin diaphragm 52 sharp edges on its inner border. This further increases the insensitivity to imprecision in the position of the displacement body 53.

Figure 4:
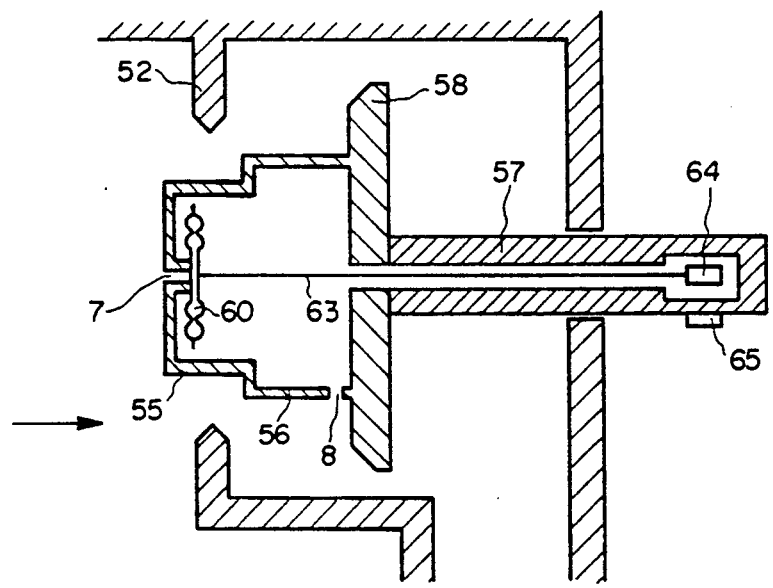
FIG. 4 shows a measuring device to measure the pressure difference, in accordance with the present invention.

The means to measure the pressure difference is advantageously placed inside the displacement body 53. FIG. 4 shows the construction of such a displacement body 53. Within the displacement body 53 is a pressure measuring element 60 which is interlockingly combined with the displacement body 53 and which is connected via the first opening 7 and the second opening 8 to the spaces in front and behind the circular pin diaphragm 52, in the direction of flow, so that the differential pressure acts directly upon the pressure difference measuring element 60. The deformation of the pressure difference measuring element 60 is transmitted via a rod 63 directly to a measuring system comprising a magnet 64 and a Hall probe 65. The pressure difference is thus converted so that its value can be scanned in form of a voltage on the Hall probe 65. This voltage value can be transmitted to the computer 12 as shown in the embodiments according to FIGS. 1 and 2.

Figure 5:
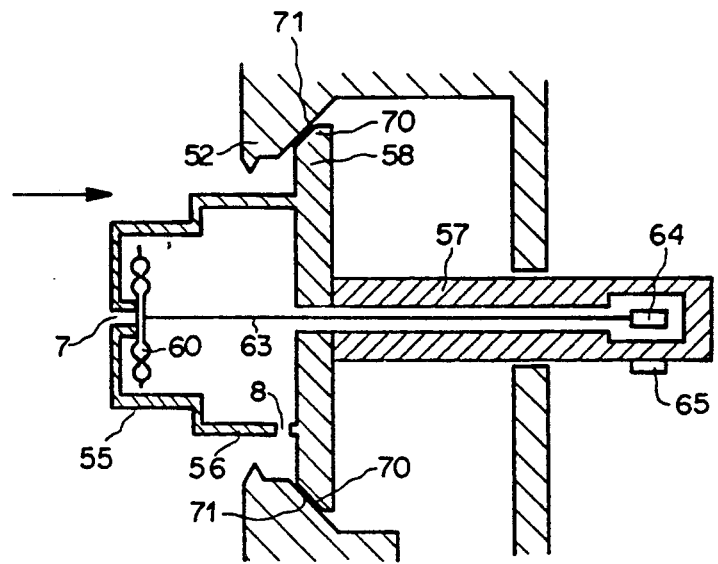
FIG. 5 shows a switchable choke element with means to measure the pressure difference in the closed position, in accordance with the present invention.

It is furthermore advantageous for the openings 7 and 8 to be placed so that they are located on one side of the choke element sealed by the plate 58, as seen in direction of flow, as shown in FIG. 5. The plate 58 is provided with a sealing surface 70 which presses in closed position (position 0) against a seat 71 in the housing 50. In this manner the pressure difference on the pressure difference measuring element 60 is always zero when the valve is closed. This affords the possibility of adjusting the output signal of the measuring system comprising the magnet 64 and the Hall probe 65 to zero. This adjustment can be achieved advantageously within the computer 12, always when the choke element has reached position 0. In this manner correction of the measuring value of the pressure difference can be carried out with a closed choke element 4.

The switch 26 can be pulse-controlled. Thus it is possible to display measuring values which cyclically follow each other: Flow-through rate, e.g. liters per hour, accumulated flow-through quantity, e.g. in cubic meters, heat flow, e.g. in kilo-joule per hour and quantity of heat, e.g. in kilowatt-hours.

In the above-mentioned embodiments, the choke element 4 together with its appertaining elements is built into the initial conduit 1 of a heating circuit. However it is also possible to build the choke element 4 into the return conduit 2.

We claim:

1. An arrangement for measuring a property of a flow medium in a conduit comprising
   a choke element located in said conduit, said choke element having at least first and second positions with different first and second cross-sections, respectively, only one of which positions is effective to control the flow of the flow medium in the conduit at any given time,
   pressure measuring means for measuring the pressure difference of said flow medium between locations on both sides of said choke element in said conduit, and
   drive means for switching said choke element from said first position to said second position only when said pressure difference is less than a first threshold pressure, and for switching said choke element from said second position to said first position only when said pressure difference is greater than a second threshold pressure, said second threshold pressure being greater than said first threshold pressure so that a hysteresis of operation is provided,
   computer means responsive to said pressure measuring means for controlling said drive for switching said choke element between said first and second positions so that said pressure difference is measured by said pressure measuring means over a wide measuring range and for calculating a property of said flow medium in said conduit based on said pressure difference.

2. Device as in claim 1, wherein the choke element comprises a circular pin diaphragm and a displacement body with first and second portions having first and second cross-sections, said displacement body being axially shiftable relative to said pin diaphragm.

3. Device as in claim 2, wherein the circular pin diaphragm has sharp edges.

4. Device as in claim 2, wherein the displacement body comprises a plurality of axially aligned individual cylinders with different diameters.

5. Device as in claim 2 wherein the means for measuring the pressure difference is located within the displacement body.

6. Device as in claim 1, wherein the choke element has a third position in which the conduit is closed, and wherein the computer includes means for ignoring said pressure measuring means when the choke element is in the third position.

7. Device as in claim 6, wherein said choke element comprises a body having first and second portions with first and second cross-sections corresponding to said first and second positions and a plate corresponding to said third position, said body being movable in relation to a seat located in a housing enclosing a portion of said conduit, and wherein said pressure measuring means is connected to spaces before and after the choke element.

8. Device as in claim 7, wherein said computer provides a correction of the measured value of the pressure difference when the choke element is in the closed position.

9. The device of claim 1 wherein said conduit forms part of a heat circuit, wherein said device includes means for measuring a temperature difference in said heat circuit and, wherein said computer is responsive to said temperature difference measuring means.

* * * * *